US005585644A

United States Patent [19]

Van Der Borst

[11] Patent Number: 5,585,644

[45] Date of Patent: Dec. 17, 1996

[54] POLYETHYLENE NAPHTHALATE X-RAY WINDOW

[75] Inventor: Johannes Van Der Borst, Eindhoven, Netherlands

[73] Assignee: U.S. Philips Corporation, New York, N.Y.

[21] Appl. No.: 568,775

[22] Filed: Dec. 7, 1995

[30] Foreign Application Priority Data

Dec. 19, 1994 [EP] European Pat. Off. .............. 94203669

[51] Int. Cl.$^6$ ............................ G01T 1/185; H01J 47/00

[52] U.S. Cl. ........................................ 250/505.1; 378/161

[58] Field of Search .......................... 250/505.1; 378/161

[56] References Cited

U.S. PATENT DOCUMENTS

| | | | |
|---|---|---|---|
| 4,933,557 | 6/1990 | Perkins et al. | 250/505.1 |
| 5,173,612 | 12/1992 | Imai et al. | 250/505.1 |
| 5,345,083 | 9/1994 | De Koning | 250/379 |

OTHER PUBLICATIONS

Caruso et al., Review of Scientific Instruments, vol. 39, No. 7, Jul., 1968, pp. 1059–1060.

*Primary Examiner*—Jack I. Berman
*Attorney, Agent, or Firm*—Anne E. Barschall

[57] ABSTRACT

An X-ray window for an X-ray component such as an X-ray detector. Windows of this kind must be as thin as possible so as to minimize X-ray absorption. The known material polypropylene is not available in the desired thickness of the order of 1 μm, and stretching of this material so as to reduce the thickness causes an inadmissible spread in thickness. The material polyethylene naphthalate (PEN) in accordance with the invention is available in the desired thickness and with a much smaller spread in thickness. Furthermore, the window material should exhibit suitable mechanical properties (such as strength, rigidity and tightness) which are not allowed to degrade significantly under the influence of continuously varying circumstances in respect of pressure, temperature and X-rays. In comparison with the known polyethylene terephtalate (PET), PEN in this respect has better properties which satisfy the mechanical requirements.

9 Claims, 1 Drawing Sheet

POLYETHYLENE NAPHTHALATE X-RAY WINDOW

The invention relates to an X-ray component, such as an X-ray detector, comprising an X-ray transparent window of a synthetic material. The invention also relates to an X-ray window for use in such an X-ray component.

An X-ray component of this kind in the form of an X-ray detector is known from U.S. Pat. No. 5,345,083 (PHN 13.991).

The X-ray detector described therein is an ionization detection filled with a detector gas. This type of detector is used in X-ray analysis equipment in which a specimen is irradiated by X-rays from an X-ray tube and the X-rays emanating from the specimen are detected in the detector. In such equipment it is often desirable to expose the specimen to comparatively longwave X-rays. Because the absorption of such radiation in air or other gases is comparatively high, the entire specimen space of this analysis equipment, including the X-ray tube and the X-ray detector, is evacuated during operation. The X-ray window in the detector then serves inter alia to separate the space containing the detector gas from the vacuum space. Therefore, the X-ray window must be capable of withstanding pressures of the order of magnitude of atmospheric pressure. Moreover, the window must be capable of withstanding very many (=several thousands) pressure changes between zero and atmospheric pressure without its gas tightness and strength being degraded significantly.

Besides mechanical quality of the window in respect of pressure changes, X-ray absorption is also an important quality aspect of an X-ray window. The aim is to minimize the X-ray absorption of the window in order to save an as large as possible quantity of X-rays from the specimen for detection. Therefore, the aim is to minimize the X-ray window thickness.

The cited United States Patent discloses an X-ray window made of polypropylene or of polyethylene terephtalate (PET) which is also known as "mylar". These materials are synthetic materials containing almost exclusively elements of low atomic number (carbon and hydrogen), so that the absorption of long-wave X-rays by the material of these windows is comparatively low.

Because of the requirement of low absorption, the aim is to manufacture X-ray windows of a thickness of less than, for example 1 μm. However, said polypropylene is not commercially available as a foil of this thickness, so that it would have to be treated prior to manufacture so as to achieve such a small thickness. The small thickness could be pursued by stretching the foil, but it has been found that this process leads to a large spread (up to 50%) in respect of the ultimate thickness of the foil, causing an inadmissible spread in the behaviour of the detectors in which these windows are used.

Said PET can be obtained in the desired thickness, but has a number of undesirable mechanical properties, such as a low elasticity modulus, low resistance to leakage when exposed to numerous temperature fluctuations, and a low resistance to radiation.

It is an object of the invention to provide an X-ray window whose material is available in the desired thickness, with a small spread in respect of thickness, and which nevertheless exhibits suitable mechanical properties.

To this end, the X-ray component in accordance with the invention is characterized in that the window comprises a layer of polyethylene naphthalate (PEN).

Because PEN of the desired thickness is commercially available and has been found to exhibit the appropriate mechanical properties, even after a large number of pressure changes, temperature fluctuations and irradiation by X-rays, it has been found that X-ray windows made of PEN satisfy said requirements better than windows made of materials known from the state of the art.

In a preferred embodiment of the invention, the window is constructed so as to comprise a mounting frame which is glued onto the PEN layer. The window can thus be readily detached and easily handled and can still be simply manufactured.

The X-ray component manufactured in accordance with the invention can be used in an X-ray analysis apparatus such as an apparatus for X-ray fluorescence and/or X-ray diffraction. In many cases a collimator is then arranged in the beam path between the specimen and the X-ray component. Such collimators often consist of a stack of X-ray absorbing plates wherebetween the X-rays pass. An embodiment of an X-ray analysis apparatus in accordance with the invention is characterized in that the end face of the collimator contacts the X-ray window. As a result of this integrated construction, a separate supporting grid for the very thin PEN foil can be dispensed with.

These and other aspects of the invention will be apparent from and elucidated with reference to the embodiments described hereinafter.

Figure 3A:
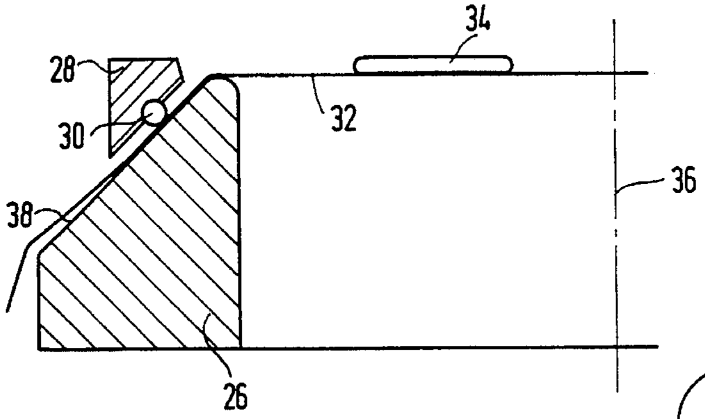
Figure 3B:
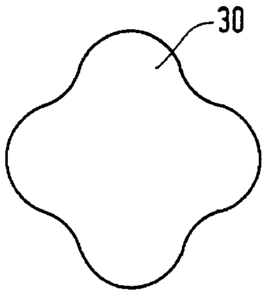

FIG. 3*a* is a sectional view of a tool for manufacturing an X-ray window from a very thin foil, FIG. 3*b* is a sectional view of a flexible ring for use in the tool shown in FIG. 3*a*.

Figure 1:
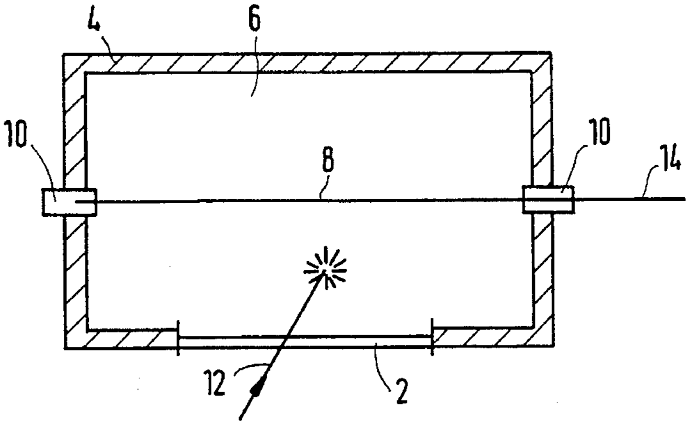
FIG. 1 is a diagrammatic sectional view of a gas-filled X-ray detector comprising a PEN window in accordance with the invention.

FIG. 1 shows an X-ray detector in which the X-ray window in accordance with the invention can be used. The detector is constructed so as to have a housing 4 provided with an entrance window 2. Said housing encloses a space 6 which contains a detector gas and also accommodates further detector components such as an anode wire 8 which is insulated from the metal housing 4 by way of insulators 10. Incident X-rays 12 cause ionization of the detector gas 6, so that a charge pulse is intercepted by the anode wire 8; this pulse is further processed by processing equipment (not shown) connected to output 14. The input window 2 should be as thin as possible so as to minimize the X-ray absorption; however, it should be thick enough to provide suitable gastight sealing in different operating conditions, such as fluctuating temperatures and pressures. This imposes severe requirements as regards the window material.

Figure 2:
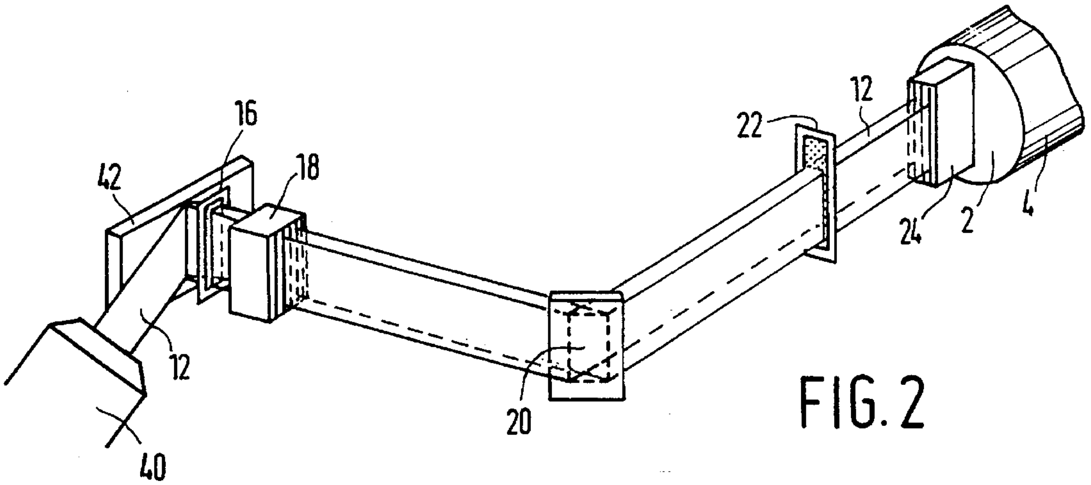
FIG. 2 shows a relevant part of an analysis apparatus comprising an X-ray detector with a PEN window in accordance with the invention.

FIG. 2 shows a relevant part of an analysis apparatus in accordance with the invention. An X-ray source 40 emits an X-ray beam 12 which is incident on the specimen 42 to be analysed. X-ray fluorescence in the specimen excites X-rays which are incident on an analysis crystal 20 via a first beam limiter 16 and a first collimator 18. In the crystal wavelength selection of the excited X-rays takes place. The X-rays of the selected wavelength are ultimately detected by the X-ray detector 4. Before the X-rays enter the detector 4 via the window 2, they pass a second beam limiter 22 and a second collimator 24 which is arranged against the X-ray window 2.

This collimator is of the Soller type, i.e. it consists of a stack of mutually parallel plates of an X-ray absorbing material (as diagrammatically shown in the Figure) with a given spacing for conducting the X-rays which are thus parallelized. The edges of the plates facing the X-ray window together constitute a grid-like end face which can serve as a supporting grid for the foil of the X-ray window. As a result of this arrangement, a separate supporting grid for the X-ray window can be dispensed with.

FIG. 3 is a sectional view of a tool for manufacturing an X-ray window from a very thin foil. The PEN foil 32 is arranged on a first ring 26 having a conical outer surface 38. On the conical outer surface 38 there can be arranged a second ring 28 in which a ring 30 of a flexible material (for example, rubber) is inserted. Both rings have a common centre line 36. Even though the cross-section of the flexible ring 30 is shown to be circular in FIG. 3*a*, a cross-section for obtaining more grip on the foil is that shown in FIG. 3*b*. After the foil 32 has been arranged on the first ring 26, the second ring 28 is arranged thereon and pressed down. As a result, the foil 32 is tensioned and the necessary operations can be performed thereon, for example gluing a mounting frame to the foil so as to enable the window to be mounted in the X-ray equipment; this mounting frame makes the window readily detachable as a loose window which can be easily handled. Moreover, in the tensioned condition the foil may be provided with a metal layer (for example, gold or aluminium) for charge dissipation if the window is to be used in a gas discharge detector.

I claim:

1. An X-ray component, comprising an X-ray transparent window of a synthetic material, characterized in that the window comprises a layer of polyethylene naphthalate.

2. An X-ray component as claimed in claim 1, characterized in that the thickness of the layer of polyethylene naphthalate is between 0.4 μm and 5 μm.

3. An X-ray component as claimed in claim 1, characterized in that a mounting frame is glued onto the layer of polyethylene naphthalate.

4. An X-ray analysis apparatus comprising an X-ray component as claimed in claim 1 and a collimator with an end surface facing the window, characterized in that the end surface of the collimator contacts the X-ray window.

5. An X-ray component as claimed in claim 1, characterized in that said X-ray component is an X-ray detector.

6. An X-ray window as suitable for use in an X-ray component, characterized in that the window comprises a layer of polyethylene naphthalate.

7. An X-ray window as claimed in claim 6, characterized in that the layer of polyethlene napthalate has a thickness of between 0.4 μm and 5 μm.

8. An X-ray window as in claimed 6 characterized in that a mounting frame is glued onto the layer of polyethylene naphthalate.

9. An X-ray window as claimed in claim 6, characterized in that the X-ray component in which said X-ray window is used is an X-ray detector.

* * * * *